United States Patent Office 3,812,153
Patented May 21, 1974

3,812,153
PROCESS FOR PRODUCING MONOALKANOYL-
FLUORESCEINS
Harvey Gurien, Maplewood, N.J., assignor to
Hoffmann-La Roche Inc., Nutley, N.J.
No Drawing. Filed Dec. 5, 1972, Ser. No. 312,386
Int. Cl. C07d 7/42
U.S. Cl. 260—335                                      5 Claims

ABSTRACT OF THE DISCLOSURE

Higher monoalkanoylfluoresceins are prepared by a process wherein a higher alkanoyl halide and fluorescein are reacted in a suitable aprotic solvent and the product, higher monoalkanoylfluorescein, substantially free of undesirable contaminants and co-products is isolated. The higher alkanoylfluoresceins are useful in fluorometric methods for determining lipolytic hemolysis.

SUMMARY OF THE INVENTION

This invention relates to a process for the preparation of higher monoalkanoylfluoresceins represented by the formula

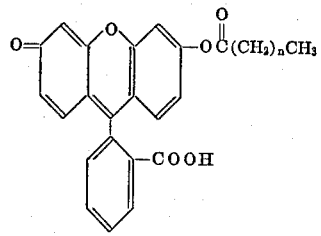

wherein $n$ is a whole number from 8 to 16 inclusive.

The process is carried out generally by reacting, under anhydrous conditions in an intert atmosphere, a higher alkanoylhalide and fluorescein in the presence of a suitable aprotic organic solvent at a suitable temperature, removing the solvent and separating the product from unreacted fluorescein by dissolving it in an appropriate selective aromatic solvent, washing with a basic substance to neutralize any acid formed, filtering through silica gel or other similar appropriate medium, then crystallizing from the aromatic solvent with a selective non-solvent for the product.

DETAILED DESCRIPTION OF THE INVENTION

Higher monoalkanoylfluoresceins have recently found use in fluorometric methods for quantitatively determining lipase activity of body fluids. However, the compounds are difficult to make in sufficient purity and high enough yields to make them available in commercial quantities at a reasonable cost.

We have discovered a method whereby higher monoalkanoylfluoresceins containing from 10 to 18 carbon atoms in the alkanoyl moiety can be made available in commercial quantities in high purity and at a reasonable cost. We have found that by reacting the appropriate higher alkanoyl halide with fluorescein under essentially anhydrous conditions in a suitable aprotic organic solvent at an appropriate temperature under an inert atmosphere that the product, higher monoalkanoylfluorescein, is produced without being contaminated with higher dialkonoyl-fluorescein. We have found that this reaction succeeds when the proper combination of selective extractive solvents are used together with the proper reaction conditions for producing the product.

The alkanoyl halide which is used as the source of the alkanoyl moiety in the process is a higher alkanoyl halide containing from 10 to 18 carbon atoms. Preferred for use in this invention is decanoyl halide since the resulting product, monodecanoylfluorescein, is particularly useful for determining lipase activity. The halide can be any of the halides, i.e., iodide, chloride, fluoride or bromide, however, because of its ready availability, the chloride is the preferred starting material. Thus, in its most preferred embodiment, decanoyl chloride is the starting material.

In carrying out the reaction, it is preferred to utilize about 1 mole of alkanoyl halide per mole of fluorescein in the reaction since the reaction is stoichiometric.

The reaction should be carried out under essentially anhydrous conditions in order to avoid the side reactions resulting from the presence of moisture. If non-anhydrous conditions are used, the yields are adversely affected.

The reaction should also be carried out in an inert atmosphere in order to avoid the formation of co-products and minimize side reactions. Suitable inert atmospheres are argon and nitrogen, with nitrogen preferred.

The solvent in which the reaction is carried out should be an aprotic organic solvent which is easily removed under vacuum, catalyzes the reaction of fluorescein with acid halides and dissolves the product. Dimethylformamide (DMF) has been found to be most suitable, however, dimethylsulfoxide (DMSO) or hexamethyl phosphoric triamide (HMPT) can also be used. The amount of solvent used in the reaction is important since the yields of the monoalkanoylfluorescein are affected. It has been found that on a volume basis from 8 to 30 volumes of solvent per volume of fluorescein are suitable for use in this process, with from 10 to 15 volumes preferred. 10 volumes is most preferred when DMF is the solvent and monodecanoylfluorescein is the product.

The temperature at which the process is operable is in the range of from about 15° C. to about 30° C. with room temperature, e.g., about 20° C. to 25° C. preferred. Higher temperatures result in undesirable side reactions with production of increasing amounts of the dialkanoylfluorescein.

To be useful in this invention, the selective aromatic solvent must be a non-solvent for fluorescein and a solvent for the monoalkanoylfluoresceins. Typical of such solvents are benzene and toluene. Preferred for use in this invention is benzene.

The adsorbing filtering medium must be such that the products are adsorbed thereon and the impurities remain in the filtrate which is discarded. Typical of such adsorbing filtering media are alumina and silica gel. Silica gel is preferred for use in this invention. Typical of the silica gels which are suitable is Silica Gel 7734 by Merck, a product having a particle size of from about 0.05 to 0.2 mm.

When removing the product from the silica gel, it is eluted in a solvent system which selectively dissolves the higher alkanoylfluorescein. Such solvent systems are mixtures of 2 to 15 volumes of aromatic solvent mixed with one volume of diethyl ether. Preferable is a volume ratio of 4 parts aromatic solvent to one of diethyl ether. The preferred aromatic solvents are benzene or toluene.

In order to separate the product from the eluate, a non-solvent for the product must be added. The most suitable nonsolvent is hexane.

Prior to filtration through the adsorbing filter medium, the dissolved product is treated wtih a basic material to neutralize any unreacted acid present. A suitable neutralizing agent is sodium bicarbonate, however, other alkali metal bicarbonates can also be used.

It has also been found that if the higher alkanoyl halide is added slowly to the fluorescein reactant the tendency for side reaction and formation of the dialkanoyl compound is depressed. By slowly is meant about 4 to 6 ml. per hour of alkanoyl halide dissolved in about 40 to 50 ml. of solvent.

The reaction is run for a time sufficient to complete the reaction. Generally it is run overnight, however, somewhat shorter or longer times are suitable. Generally, the reaction is run from two to twelve hours.

The following Examples illustrate the invention.

Example 1

25.0 g. (0.075 mole) of fluorescein and 490 ml. of dimethylformamide were added to a 1 l. 3-neck flask equipped with stirrer, Herschberg dropping funnel and a nitrogen atmosphere. A mixture of 13.6 g. of decanoylchloride (0.071 mole) in 50 ml. of dimethylformamide was added, while stirring at room temperature, to the flask through the dropping funnel, over a period of 10 hours, gradually effecting complete solution. The dimethylformamide was then removed at reduced pressure (0.5 mm.), 400 ml. of benzene was added, the resulting mixture stirred 20 min., filtered and washed with two 40 ml. portions of benzene. The resulting presscake contained fluorescein. The combined benzene filtrates were washed with two 80 ml. portions of 0.1 N sodium bicarbonate solution and 60 ml. of water, dried over sodium sulfate, then calcium sulfate and filtered through a pad of 120 g. of silica gel contained in a 600 ml. sintered glass funnel. The silica gel was washed with four 100 ml. portions of benzene-ether 4:1 v./v., each wash-filtrate being kept separate. Concentration of the filtrates yielded the following: benzene-ether 1–0.5 g.; benzene-ether 2–7.95 g.; benzene-ether 3–11.20 g.; benzene-ether 4–2.65. The benzene-ether residues were combined and crystallized by solution in 95 ml. of boiling benzene followed (after removal from heat) by addition of 240 ml. of hexane. The mixture was continually stirred and seeded as it was allowed to cool to room temperature and then placed in the refrigerator overnight. The crystals were filtered, washed with benzene-hexane 2:5 v./v. and dried at reduced pressure at 50° C. The yield of monodecanoylfluorescein was 12.0 g., M.P. 89–90°.

Example 2

25.0 g. (0.075 mole) of fluorescein and 250 ml. of dimethylformamide were added to a 1 l. 3-neck flask equipped with stirrer, Herschberg dropping funnel and a nitrogen atmosphere. A mixture of 13.6 g. of decanoylchloride (0.071 mole) in 40 ml. of dimethylformamide was added, while stirring at room temperature, to the flask through the dropping funnel, over a period of 10 hours, gradually effecting complete solution. The dimethylformamide was then removed at reduced pressure (0.5 mm.), 400 ml. of benzene was added, the resulting mixture stirred 20 min., filtered and washed with two 40 ml. portions of benzene. The resulting presscake contained fluorescein. The combined benzene filtrates were washed with two 80 ml. portions of 0.1 N sodium bicarbonate solution and 60 ml. of water, dried over sodium sulfate, then calcium sulfate and filtered through a pad of 120 g. of silica gel contained in a 600 ml. sintered glass funnel. The silica gel was washed with five 100 ml. portions of benzene-ether 4:1 v./v. Concentration of the combined filtrates yielded 31.3 gms. of crude product. The benzene-ether residues were combined and crystallized by solution in 135 ml. of boiling benzene followed (after removal from heat) by addition of 340 ml. of hexane. The mixture was continually stirred and seeded as it was allowed to cool to room temperature and then placed in the refrigerator overnight. The crystals were filtered, washed with benzene-hexane 2:5 v./v. and dried at reduced pressure at 50° C. The yield of monodecanoylfluorescein was 18.0 g., M.P. 89–90°.

I claim:

1. A method for preparing compounds represented by the formula

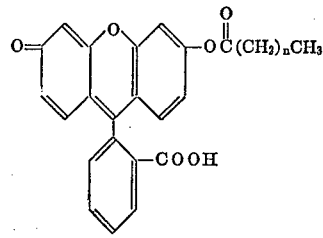

wherein $n$ is a whole number from 8 to 16 inclusive, comprising reacting a higher alkanoyl halide containing from 10 to 18 carbon atoms with fluorescein at a temperature of from about 15° C. to about 30° C. under anhydrous conditions in an inert atmosphere for a time sufficient to complete the reaction, wherein the reaction takes place in an aprotic organic solvent selected from dimethylformamide, dimethylsulfoxide or hexamethyl phosphoric triamide in which the reactants are slowly brought into contact, the resulting reaction mixture after completion of the reaction is neutralized with a basic material, and the product is isolated by filtering on an adsorbing filter medium selected from alumina and silica gel then eluted with an aromatic solvent-ether mixture containing from 2 to 15 volumes of aromatic solvent and one volume of ether and finally crystallized therefrom with hexane.

2. The method of claim 1 wherein the reactants are monodecanoyl chloride and fluorescein, the reaction solvent is dimethylformamide and the inert atmosphere is nitrogen.

3. The process of claim 2 wherein the decanoyl chloride in solution is added to the reaction medium at the rate of about 4 to 6 ml. per hour.

4. The process of claim 2 wherein the aromatic solvent-ether mixture is 2 to 15 volumes of benzene per volume of ether.

5. The process of claim 2 wherein the adsorbing filter medium is silica gel.

References Cited

FOREIGN PATENTS 2,040,033    2/1972    Germany.

NORMA S. MILESTONE, Primary Examiner